United States Patent
Shifman et al.

(10) Patent No.: US 6,365,250 B2
(45) Date of Patent: *Apr. 2, 2002

(54) BLENDS OF FLUOROELASTOMER INTERPOLYMERS WITH THERMO FLUOROPLASTIC INTERPOLYMERS AND THE USE OF SUCH BLENDS IN HOSES

(75) Inventors: Jerry Shifman, Wildersville, TN (US); Daniel G. Shell, Crestline, OH (US)

(73) Assignee: Dayco Products, Inc., Miamisburg, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/754,674

(22) Filed: Jan. 4, 2001

Related U.S. Application Data

(62) Division of application No. 09/083,294, filed on May 22, 1998, now Pat. No. 6,203,873.

(51) Int. Cl.[7] .......................... B32B 25/14; B32B 27/28
(52) U.S. Cl. .................... 428/36.8; 428/36.6; 428/36.7; 428/36.91; 428/212; 428/421; 428/422; 525/199
(58) Field of Search .................. 428/36.91, 36.6, 428/36.7, 421, 212, 422, 36.8; 525/199

(56) References Cited

U.S. PATENT DOCUMENTS

| | | | | |
|---|---|---|---|---|
| 3,864,228 A | * | 2/1975 | Rossetti | 204/159.2 |
| RE32,230 E | * | 8/1986 | Satoh et al. | 138/126 |
| 4,758,455 A | * | 7/1988 | Campbell et al. | 428/36 |
| 5,109,071 A | * | 4/1992 | Johnson et al. | 525/199 |
| 5,320,888 A | * | 6/1994 | Stevens | 428/36.2 |
| 5,639,528 A | * | 6/1997 | Feit et al. | 428/36.91 |
| 5,718,957 A | * | 2/1998 | Yokoe et al. | 428/36.91 |
| 6,703,873 | * | 3/2001 | Shifman et al. | 428/36.8 |

* cited by examiner

Primary Examiner—Harold Pyon
Assistant Examiner—Sandra M. Nolan
(74) Attorney, Agent, or Firm—Joseph V. Tassone

(57) ABSTRACT

A composition having improved fuel vapor barrier properties comprising a blend of about 20 to 80 weight percent of a first fluorointerpolymer with about 80 to 20 weight percent of a second fluorointerpolymer, the first fluorointerpolymer comprising a copolymer, terpolymer or mixture thereof formed by the copolymerization of two or more monomers selected from the group consisting of hexafluoropropylene, vinylidene fluoride and tetrafluoroethylene, and the second fluorointerpolymer comprising a copolymer, terpolymer or mixture thereof formed by the copolymerization of two or more monomers selected from the group consisting of hexafluoropropylene, vinylidene fluoride and tetrafluoroethylene, wherein the first fluorointerpolymer exhibits elastomer characteristics and the second fluorointerpolymer exhibits thermoplastic characteristics.

9 Claims, 1 Drawing Sheet

BLENDS OF FLUOROELASTOMER INTERPOLYMERS WITH THERMO FLUOROPLASTIC INTERPOLYMERS AND THE USE OF SUCH BLENDS IN HOSES

This application is a divisional patent application of its parent patent application, Ser. No. 09/083,294, filed May 22, 1998, now U.S. Pat. No. 6,203,873.

BACKGROUND OF THE INVENTION

The present invention relates generally to hoses and particularly to fuel transport hoses such as fuel filler and fuel filler neck hoses having reduced permeability to fuel vapors. More particularly, this invention relates to blends of fluorelastomer interpolymers with fluorothermoplastic interpolymers, and to the use of such blends as a barrier layer for fuel transport hoses to reduce the permeability of such hoses to fuel vapors.

Recent environmental regulations imposed on the automotive industry severely limit the amount of fuel vapor that can permeate from the fuel systems of motor vehicles. Choosing the right polymer to provide high performance, long service life, and reduced permeability of fuel in the fuel systems of motor vehicles while maintaining costs at an acceptable level has been more difficult for automotive designers than ever before. Typically, fuel transfer and fuel vapor hoses have been made of butadiene-acrylonitrile rubber as the tube, but such hoses have a high permeability to fuel. Other hoses have a fluoroelastomer as the inner wall surface layer of the hose, but such hoses have higher permeability to fuel vapors. Attempts to produce fuel transfer hoses with reduced permeability to fuel vapors have included the use of corrugated polyamide and fluorocarbon thermoplastic tubes. However, these structures are very expensive.

Other attempts to produce a fuel filler neck hose with reduced permeability to fuel vapors used a tetrafluoroethylene-hexafluoropropylene-vinylidene fluoride terpolymer liner and a thicker layer of hexafluoropropylene-vinylidene fluoride copolymer or other suitable elastomer as the conductive inner part of the tube. See, for example, U.S. Pat. No. 4,606,952 to Sugimoto and U.S. Pat. No. 5,430,603 to Albino et al. Such hose structures have a tendency to wrinkle on the inner radius of the forming mandrel or pin causing a cosmetic defect.

Accordingly, there is a need for an improved fuel hose that meets present industry standards.

SUMMARY OF THE INVENTION

In accordance with the present invention a blend of a first fluorointerpolymer having elastomer characteristics and a second fluorointerpolymer having thermoplastic characteristics unexpectedly provides a composition which not only meets the low permeability standard for fuel vapor, but also is relatively inexpensive to produce, exhibits good service life and, when used in the manufacture of fuel transfer hoses, has a good push-on value, seals well, has good low temperature properties and resists kinking and wrinkling of the hose structure while being formed in conventional molding techniques.

In a first embodiment of the invention, a composition having improved fuel vapor barrier properties is provided. The composition comprises a blend of a first fluorointerpolymer which comprises a copolymer, terpolymer or mixture thereof formed by the copolymerization of two or more monomers selected from the group consisting of hexafluoropropylene, vinylidene fluoride and tetrafluoroethylene, and a second fluorointerpolymer which comprises a copolymer, terpolymer or mixture thereof formed by the copolymerization of two or more monomers selected from the group consisting of hexafluoropropylene-vinylidene fluoride and tetrafluoroethylene, wherein the first fluorointerpolymer exhibits elastomeric characteristics and said second fluorointerpolymer exhibits thermoplastic characteristics.

In a second embodiment of the invention, a hose having improved fuel vapor barrier properties is provided. The hose comprises a barrier layer comprising a blend of about 20 to 80 weight percent of a first fluorointerpolymer with about 80 to 20 weight percent of a second fluorointerpolymer, the first interpolymer comprising a copolymer, terpolymer or mixture thereof formed by the copolymerization of two or more monomers selected from the group consisting of hexafluoropropylene, vinylidene fluoride and tetrafluoroethylene, and the second fluorointerpolymer comprising a copolymer, terpolymer or mixture thereof formed by the copolymerization of two or more monomers selected from the group consisting of hexafluoropropylene, vinylidene fluoride and tetrafluoroethylene wherein the first fluorointerpolymer exhibits elastomeric characteristics and the second fluorointerpolymer exhibits thermoplastic characteristics. The hose not only exhibits reduced permeability to fuel vapors, but also avoids kinking and wrinkling in conventional molding techniques, provides extended service life, and is relatively inexpensive to produce.

In a first manifestation of the hose of the present invention, the hose structure comprises a conductive or non-conductive barrier layer comprising a blend of a first fluorointerpolymer having elastomer characteristics and a second fluorointerpolymer having thermoplastic characteristics; and a protective cover adjacent to and surrounding the conductive barrier layer.

In a second manifestation of the hose of the present invention, the hose structure comprises a conductive or non-conductive barrier layer comprising a blend of a first fluorointerpolymer having elastomeric characteristics and a second fluoro-interpolymer having thermoplastic characteristics as a barrier layer forming the interior wall of the hose; an elastomeric layer adjacent to and surrounding the outermost surface of the barrier layer; a reinforcing layer adjacent to and surrounding the outermost surface of the elastomeric layer; and a protective cover layer adjacent to and surrounding the outer surface of the reinforcing layer.

In a third manifestation of the invention, the hose structure comprises a conductive or non-conductive elastomeric layer which forms the interior surface of the hose; a barrier layer comprising a blend of a first fluorointerpolymer having elastomer characteristics adjacent to and surrounding the outermost surface of the first elastomeric layer; a reinforcing layer adjacent to and surrounding the elastomeric layer; and a protective cover layer adjacent to and surrounding the reinforcing layer.

In a fourth manifestation of the invention, the hose structure comprises a first conductive or non-conductive elastomer layer which forms the interior surface of the hose; a barrier layer comprising a blend of a first fluorointerpolymer having elastomer characteristics and a second fluorointerpolymer having thermoplastic characteristics adjacent to and surrounding the outer most surface of the first elastomeric layer; a second elastomeric layer adjacent to and surrounding the outermost surface of the barrier layer; a reinforcing layer adjacent to and surrounding the outermost surface of the second elastomeric layer; and a protective cover layer adjacent to and surrounding the reinforcing layer.

Surprisingly, the hoses of the invention reduce the permeability of hydrocarbon vapors, particularly fuel vapors from the hose to below proposed industry standards have good low temperature properties, have good push-on values, exhibit extended service life, and are relatively inexpensive to produce without any wrinkles caused by sharp turns, curves and bends during the formation of the hose on a forming mandrel or pins.

It is an object of the invention to provide a blend of a first fluorointerpolymer having elastomer characteristics and a second fluorointerpolymer having thermoplastic characteristics wherein the first fluorointerpolymer having elastomeric properties comprises a blend of a first fluorointerpolymer which comprises a copolymer, terpolymer or mixture thereof formed by the copolymerization of two or more monomers selected from the group consisting of hexafluoropropylene, vinylidene fluoride and tetrafluoroethylene, and a second fluorointerpolymer which comprises a copolymer, terpolymer or mixture thereof formed from the copolymerization of two or more monomers selected from the group consisting of hexafluoropropylene, vinylidene fluoride and tetrafluoroethylene, wherein the first fluorointerpolymer exhibits elastomeric characteristics and the second fluorointerpolymer exhibits thermoplastic characteristics. The blend, when employed as a barrier layer in fuel transport hoses, provides low permeability to hydrocarbon fuel vapors.

It is another object of the invention to provide a hydrocarbon-resistant hose such as a fuel transfer hose, e.g., fuel filler hose that satisfies the industry standards for permeability particularly with respect to fuel vapors, that avoids kinking and wrinkling in conventional molding techniques, that has an extended service life, and that is relatively inexpensive to produce.

Other objects and advantages of the invention will be apparent from the following description and the appended claims.

DETAILED DESCRIPTION

In accordance with the invention, a blend of a first fluorointerpolymer having elastomer characteristics and a second fluorointerpolymer having thermoplastic characteristics provides a barrier layer for use in the manufacture of fuel transport hoses such as fuel filler and fuel filler neck hoses, and the like, wherein such barrier layer unexpectedly provides low levels of permeability of fuel vapors from the fuel hose. The permeation rates of fuel vapors from the fuel hose of the present invention satisfies the proposed industry standards.

Figure 1:
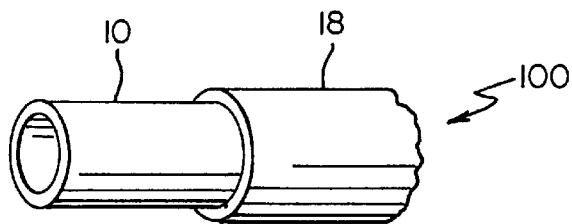
FIG. 1 is perspective cutaway view of a tubular member which illustrates a first manifestation of the present invention.

FIG. 1 is perspective cutaway view of a tubular member which illustrates a first manifestation of the present invention wherein a hose 100 is constructed which comprises a barrier layer 10 and a protective cover layer 18.

Figure 2:
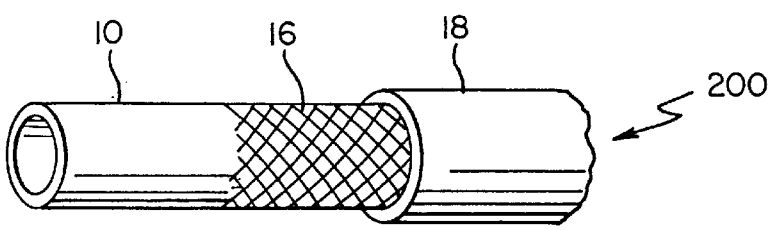
FIG. 2 is a perspective cutaway view of a tubular member illustrating another manifestation of the present invention.

FIG. 2 illustrates a second manifestation wherein a hose 200 comprises a barrier layer 10 forming the interior wall of the hose 200; a reinforcing layer 16 adjacent to and surrounding the outermost surface of the barrier layer 10; and an outer cover 18 as the exterior protective surface of the hose 200.

Figure 3:
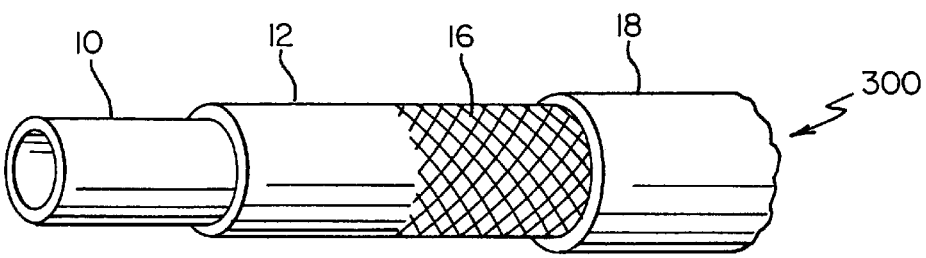
FIG. 3 is a perspective cutaway view of a tubular member illustrating still another manifestation of the present invention.

FIG. 3 illustrates a third manifestation wherein a hose 300 comprises a barrier layer 10 forming the interior wall of the hose 300; an elastomeric layer 12 adjacent to and surrounding the outermost surface of the barrier layer 10; a reinforcing layer 16 adjacent to and surrounding the elastomeric layer 12; and an outer cover 18 as the exterior protective surface of the hose 300.

Figure 4:
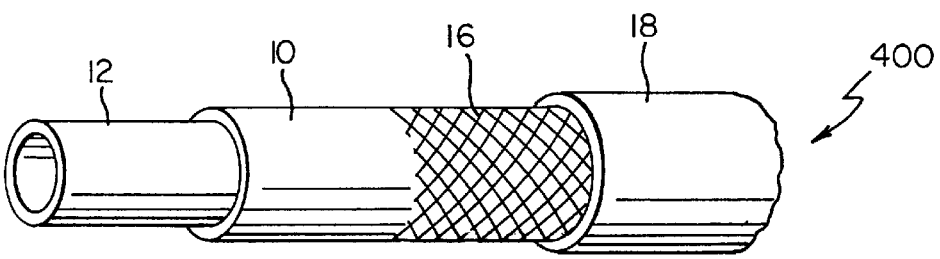
FIG. 4 is a perspective cutaway view of a tubular member which illustrates yet another manifestation of the present invention.

A fourth manifestation of the invention is illustrated in FIG. 4 where the hose 400 comprises an elastomeric layer 12 forming the interior wall surface of the hose; a barrier layer 10 adjacent to and surrounding the outermost surface of the elastomer layer 12; a reinforcing layer 16; and an outer cover 18 as the exterior surface of the hose 400.

Figure 5:
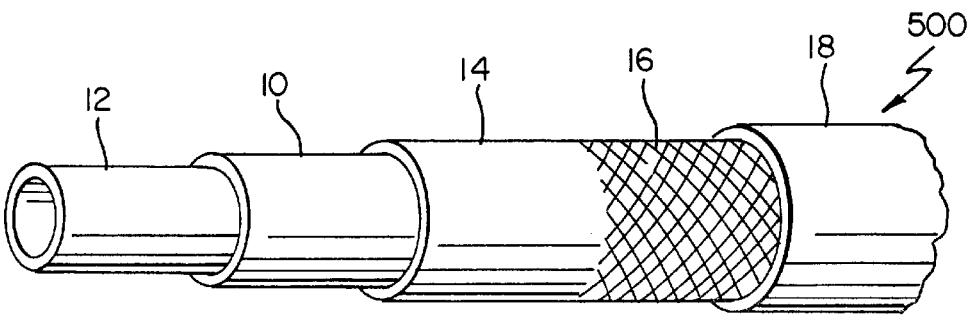
FIG. 5 is a perspective cutaway view of a tubular member which illustrates another manifestation of the present invention.

FIG. 5 illustrates a fifth manifestation of the invention in which hose 500 has a structure similar to the hose 400 shown in FIG. 4, except that a second elastomeric layer 14 resides between the barrier layer 10 and the reinforcing member 16.

The term fluorointerpolymer as used herein means the polymer produced by the copolymerization of two or more fluoromonomers and, therefore, is meant to encompass copolymers, terpolymers, etc.

The term "hydrocarbon" as used herein is meant to include fuels such as gasoline, oils, air conditioning gases, organic chemicals, and the like.

The barrier layer 10 of the invention is formed from a blend of at least two fluorointerpolymers wherein at least one of the fluorointerpolymers is characterized as a fluoroelastomer and at least one of the fluorointerpolymers is characterized as a fluorothermoplastic. Preferably, the barrier layer 10 is a fluoroelastomer which comprises hexafluoropropylene-vinylidene fluoride copolymer or vinylidene fluoride-hexafluoropropylene-tetrafluoroethylene terpolymer, blended with a fluorothermoplastic such as tetrafluoroethylene-hexafluoropropylene-vinylidene fluoride terpolymer. Most preferably the fluoroelastomer component of the blend has a fluorine content of about 65 to 73% and the fluorothermoplastic component of the blend has a typical fluorine content of 70 to 75%. The hexafluoropropylene-vinylidene fluoride fluoroelastomer is commercially available from DuPont under the name Viton A, Viton E45 or Viton 60. The vinylidene fluoride-hexafluoropropylene-tetrafluoroethylene fluoroelastomer is commercially available from 3M under the name Fluorel FT2350 or FE5830QD. The tetrafluoroethylene-hexafluoropropylene-vinylidene fluoride fluoroplastic terpolymer is a fluorothermoplastic such as Dyneon THV, which is commercially available from Dyneon.

Typically, the blend comprises about 20 to 80% by weight fluoroelastomer and about 80 to 20% by weight fluorothermoplastic. Since the permeability of the fuel hose to fuel vapors decreases with an increase in the fluorine content of the blend, a higher ratio of the fluorothermoplastic component which typically contains a higher percentage of fluorine by weight than the fluoroelastomer component may be employed in the blend 10, however, the plastic-like properties of the fluorothermoplastic components are prone to cause kinking of the hose when the fluorothermoplastic component is too high. Typically the fluorine content of the blend is about 70 to 75 weight percent. The barrier layer preferably comprises about 50 to 70% by weight of the elastomeric fluorointerpolymer and about 30 to 50% by weight of the thermoplastic fluorointerpolymer. Blends comprising about 70% by weight of the elastomeric interpolymer and about 30% by weight of the thermoplastic interpolymer have been found to provide a good balance between reduced fuel vapor permeability and good physical properties of the hose. Typically, the thickness of the barrier layer 10 is about 5 to 25 mils, preferably about 13 to 14 mils.

The composition of the present invention are either unvulcanized or vulcanized using any of the art established vulcanizing agents such as peroxides, polyols, polyamines, etc. The peroxide vulcanizing agent includes, for example, dicumylperoxide, 2,5-dimethyl-2,5-di(t-butylperoxy) hexyne-3, etc. The polyol vulcanizing agent includes, e.g., hexafluoroisopropylidene-bis(4-hydroxyphenyl) hydroquinone, isopropylidene-bis(4-hydroxyphenyl), or the like. The polyamine vulcanizing agent includes, e.g., hexamethylenediamine carbamate, alicyclic diamine carbamate, etc. The amount of vulcanizing agent employed is generally that which is customarily used in the art. Typically, about 0.5 to 10% vulcanizing agent is employed depending on the vulcanizing agent.

The elastomer layer 12 may be a conductive elastomer such as a conductive acrylonitrile-butadiene rubber, conductive ethylene-acrylate rubber and the like or a conductive fluoroelastomer such as hexafluoropropylene-vinylidene fluoride copolymer or vinylidene fluoride-hexafluoropropylene-tetrafluoroethylene terpolymer.

The elastomer layer 14 is typically a material which has properties causing it to easily adhere to both the outer cover material and the barrier blend, particularly, when vulcanized. Preferably the tubular layer 14 is an elastomer which also affords heat resistance, fuel resistance and good flexibility to the hose. Such materials are well known in the art. The elastomeric layer 14 typically is a non-conductive material selected from a group consisting of butadiene-acrylonitrile rubber, epichlorohydrin rubber, ethylene-acrylate rubber, and the like. Preferably, the elastomeric layer 14 is butadiene-acrylonitrile rubber.

The outer cover 18 of the hose is a protective layer of any of the commercially recognized materials for such use such as elastomers, thermoplastic polymers, thermosetting polymers, and the like. Typically, the protective layer is a synthetic elastomer having good heat resistance, oil resistance, weather resistance and flame resistance. Preferably, the outer cover layer is a synthetic elastomer selected from the group consisting of styrene-butadiene rubber (SBR); butadiene-nitrile rubber such as butadiene-acrylonitrile rubber; chlorinated polyethylene; chlorosulfonated polyethylene; vinylethylene-acrylic rubber, acrylic rubber; epichlorohydrin rubber such as Hydrin 200, a copolymer of epichlorohydrin and ethylene oxide available from DuPont ECO; polychloroprene rubber (CR); polyvinyl chloride; ethylene-propylene copolymers (EPM); ethylene-propylene-diene terpolymer (EPDM); ultra high molecular weight polyethylene (UHMWPE); high density polyethylene (HDPE) and blends thereof. Preferably, the synthetic elastomer is chloropolyethylene.

The reinforcing member 16 is a material which affords physical strength to the finished hose. Typically, the reinforcing member is selected from a group consisting of glass fibers, cotton fibers, polyamide fibers,.polyester fibers, and rayon fibers. Preferably, the reinforcing material is an aromatic polyamide such as Kevlar or Nomex both of which are manufactured by DuPont. The reinforcing material may be either knitted, braided, or spiraled to form the reinforcing member. In a preferred aspect of the invention, the reinforcing material is spiraled. While the reinforcing layer may be a preferred component of the hose structure, it is not critical and may or may not be used in the manufacture of certain hoses depending upon the requirements of the manufacturer.

As is common practice in the industry, the inner most layer of fuel hoses, whether it is a barrier layer 10 or an elastomer layer 12, is made conductive to prevent the buildup of static electricity generated by the flow of fuel along the inner surface of the hose. Such a build up of static electricity over time has been known to cause the formation of pin holes in the hose allowing the fuel to leak out through the holes. Typically, the barrier layer 10 or the elastomer layer 12 is made conductive by compounding the layer material with carbon black or other industry recognized ingredients to provide conductivity to the barrier layer. While the amount of carbon black added is not critical, excess carbon black tends to make the material more difficult to process. In vapor or vent applications, the innermost layer of the hose need not be conductive.

In the first embodiment of the hose of this invention as shown in FIG. 1, the barrier layer 10 is a conductive blend of a fluoroelastomer and a fluorothermoplastic wherein the fluorine content of the blend is about 70 to 75 weight percent and the ratio of fluoroelastomer to fluorothermoplastic is about 70:30. The blend 10 is made conductive by incorporating carbon black into the composition.

In the second and third embodiments of the invention as shown in FIGS. 2 and 3, the elastomeric inner tubular layer 12 which forms the inner tubular wall of the fuel transfer hose is a fluoroelastomer or elastomer having good conductive properties and fuel resistance. Preferably, the conductive fluoroelastomer or elastomer inner tubular layer 12 is selected from the group consisting of nitrile rubber (NBR), thermoplastic fluoroelastomer, such as hexafluoropropylene vinylidene fluoride copolymers or hexafluoropropylene-vinylidene fluoridetetrafluoroethylene terpolymers, polyvinyl chloride, and blends thereof. Preferably, the elastomeric, inner tubular layer is conductive NBR such as butadiene-acrylonitrile rubber.

The methods of producing the fuel transfer hose of the present invention are known in the art. For example, separate extrusion, tandem extrusion, or coextrusion processes may be used. For versatility and cost reasons, the preferred methods for producing the fuel filler transfer of the present invention are separate extrusion and tandem extrusion.

Production of the preferred embodiment of the present invention is as follows. First, the conductive layer of acrylonitrile-butadiene rubber is extruded into a tube and then immediately fed through another extruder during which the barrier layer comprising a blend of vinylidene fluoride-hexafluoropropylene-tetrafluoroethylene fluoroelastomer with tetrafluoroethylene-hexafluoropropylene-vinylidene fluoride fluorothermoplastic is applied. After the tube has been extruded and the appropriate layers applied, strands of reinforcing fibers such as Kevlar are spiraled onto the tube. A protective cover of chloropolyethylene is then applied to the reinforced tube by a cross-head extruder. The chloropolyethylene is drawn down onto the reinforced tube by use of a vacuum. The covered reinforced tube is then placed on a mandrel and vulcanized. The tube is then manually removed from the mandrel.

Other polymers, e.g., fluorinated ethylene-propylene (FEP) copolymers such as Teflon, which is available from DuPont, may be used as a component in the fluoroelastomer component, the thermoplastic component or as an additional component in the preparation of the blend.

Other additives such as antioxidants, processing aids, etc. can be employed in carrying out the present invention and it is within the scope of this invention to incorporate herein any such additives as commonly used in making fuel line hoses.

The blended fluoroelastomer/fluorothermoplastic barrier layer of the present invention is useful in reducing the permeability of fuel vapors from the fuel transfer hose; however, it is also useful in reducing the permeability of chemical vapors such as in air conditioning hoses, oil hoses, and the like where severe chemical resistance or vapor permeation resistance is required.

The use of the novel blended fluoroelastomer/fluorothermoplastic barrier layer in the fuel transfer hose of the present invention presents a means of unexpectedly achieving almost complete impermeability of fuel filler neck hoses to fuel vapors.

While the fluoroelastomer/fluorothermoplastic blend is particularly useful in hose construction to reduce permeability of fuel vapor, these blends can be used in the manufacture of other articles where reduced fuel or hydrocarbon vapor is desired such as o-rings, gaskets, diaphragms, etc.

Having described the invention in detail and by reference to preferred embodiments thereof, it will be apparent that modifications and variations are possible without departing from the scope of the invention defined in the appended claims.

What is claimed is:

1. In a method of making a flexible hose construction comprising the steps of forming a barrier layer tube made of a polymeric material and forming a protective cover layer in telescoping relation surrounding said barrier layer tube, the improvement wherein said polymeric material comprises a blend of about 20 to 80 weight percent of a first fluoropolymer having a fluorine content of about 65 to 73 weight percent with about 80 to 20 weight percent of a second fluoropolymer having a fluorine content of about 70 to 75 weight percent, said first fluoropolymer comprising a copolymer or terpolymer formed by the copolymerization of two or more monomers selected from the group consisting of hexafluoropropylene, vinylidene fluoride and tetrafluoroethylene monomers, and said second fluoropolymer comprising a terpolymer formed by the copolymerization of hexafluoropropylene, vinylidene fluoride and tetrafluoroethylene monomers, wherein said first fluoropolymer exhibits elastomeric characteristics and said second fluoropolymer exhibits thermoplastic characteristics.

2. The method of claim 1 wherein said first fluoropolymer is a vinylidene fluoride-hexafluoropropylene copolymer and said second fluoropolymer is a hexafluoropropylene-tetrafluoroethylene-vinylidene fluoride terpolymer.

3. The method of claim 1 further comprising the step of forming a reinforcing layer between said barrier layer and said protective cover layer by disposing a layer of reinforcing material onto said barrier layer before forming said protective cover layer thereon.

4. The method of claim 3 wherein said barrier layer is about 5 to 25 mils thick.

5. The method of claim 3 wherein said reinforcing layer is a layer of fibers selected from the group consisting of polyamide fibers, polyester fibers, rayon fibers, glass fibers and cotton fibers.

6. The method of claim 5 wherein said fibers are aromatic polyamide fibers.

7. The method of claim 5 wherein said fibers are knitted, braided or spiraled in the construction of said hose.

8. The method of claim 3 wherein said protective cover layer is a layer of synthetic elastomer selected from the group consisting of styrene-butadiene rubber, nitrile-butadiene rubber, chloroprene rubber, chlorinated polyethylene, chlorosulfonated polyethylene, epichlorohydrin ethylene oxide, polyvinyl chloride, and blends thereof.

9. The method of claim 8 wherein said protective cover is chlorinated polyethylene.

* * * * *